US007868063B2

(12) United States Patent
Son et al.

(10) Patent No.: US 7,868,063 B2
(45) Date of Patent: Jan. 11, 2011

(54) POLYMERIC LUBRICANT HAVING MULTI LAYER STRUCTURE AND MANUFACTURING METHOD THEREOF

(75) Inventors: Hyung-jun Son, Daegu (KR); Jeong-heon Ahn, Yeosu-si (KR); Yong-hun Lee, Yeosu-si (KR); Jung-sup Han, Pusan (KR)

(73) Assignee: LG Chem, Ltd. (KR)

( * ) Notice: Subject to any disclaimer, the term of this patent is extended or adjusted under 35 U.S.C. 154(b) by 1148 days.

(21) Appl. No.: 11/446,012

(22) Filed: Jun. 2, 2006

(65) Prior Publication Data

US 2006/0276567 A1    Dec. 7, 2006

(30) Foreign Application Priority Data

| Jun. 7, 2005 | (KR) | ................. 10-2005-0048358 |
| Nov. 10, 2005 | (KR) | ................. 10-2005-0107638 |

(51) Int. Cl.
*C03C 25/26* (2006.01)
(52) U.S. Cl. ................. 523/203; 523/201; 525/100; 525/106; 525/479; 525/902
(58) Field of Classification Search ................. 526/319, 526/326, 346; 528/10–43; 523/201; 525/902
See application file for complete search history.

(56) References Cited

U.S. PATENT DOCUMENTS

| 4,086,296 A | 4/1978 | Carty et al. ................. 260/857 |
| 5,371,149 A | 12/1994 | Kishida et al. ................. 525/309 |
| 5,942,581 A | 8/1999 | Nakamura et al. ................. 525/309 |
| 6,339,127 B1* | 1/2002 | Miyatake et al. ................. 525/106 |
| 2006/0074148 A1* | 4/2006 | Ahn et al. ................. 523/201 |

FOREIGN PATENT DOCUMENTS

| EP | 1 209 203 | * | 5/2002 |
| EP | 1 209 203 A1 | | 5/2002 |
| JP | 05339462 A | * | 12/1993 |
| JP | 2003160624 A | * | 6/2003 |
| KR | 10-2002/0083517 | * | 7/2003 |

OTHER PUBLICATIONS

Translation of JP 05339462A.*
Translation of JP 2003160624 A.*
Sauners, K.J., Organic Polymer Chemistry, $2^{nd}$ ed. Chapman and Hall, Ltd.: London, England. 1988. p. 409.*

* cited by examiner

*Primary Examiner*—Margaret G Moore
*Assistant Examiner*—Kyle Baumstein
(74) *Attorney, Agent, or Firm*—Cantor Colburn LLP

(57) ABSTRACT

Disclosed is a powdered polymeric lubricant having a multilayer structure as a processing aid capable of being used to improve processability of a vinyl chloride resin, and a manufacturing method thereof. The powdered polymeric lubricant having multi-layer structure according to the present invention has an excellent ability to prevent its adhesion to a metal surface upon its processing so as to give a long-term workability to extrusion, calendaring, blow molding, injection molding, etc., when a small amount of the powder of the present invention is mixed with a vinyl chloride resin. Accordingly, the present invention provides a powdered polymeric lubricant capable of controlling compatibility with the vinyl chloride resin and minimizing the adhesive property to a metal surface of a processing machine when a vinyl chloride resin is processed with a polymer including a silicone-based polymer.

7 Claims, No Drawings

POLYMERIC LUBRICANT HAVING MULTI LAYER STRUCTURE AND MANUFACTURING METHOD THEREOF

This application claims priority to Korean Patent Application Nos. 10-2005-0048358 filed on Jun. 7, 2005 and No. 10-2005-0107638 filed on Nov. 10, 2005 in the Korean Intellectual Property Office, and all the benefits accruing therefrom under 35 U.S.C. §119, the contents of which in their entirety are herein incorporated by reference.

TECHNICAL FIELD

The present invention relates to a polymeric lubricant having multi layer structure and a manufacturing method thereof. More specifically, the present invention relates to a polymeric lubricant having multi layer structure which is provided in the form of polymeric powder through a coagulation, dehydration and dry processes after a silicone-based polymer is used as a seed to manufacture a latex having a core-shell structure by polymerizing, with an emulsion, a predominant amount of acrylic monomers and aromatic vinyl-based monomers and a small amount of silicone polymer mixture; and manufacturing method thereof.

BACKGROUND ART

The polymeric lubricant having multi layer structure according to the present invention does not affect inherent physical properties of a vinyl chloride resin, and also minimizes an adhesive property to a surface of a processing machine upon its processing. It is provided in the form of powder and included in the polyvinyl chloride resin. Also, the polymeric lubricant according to the present invention has powder properties such as easy mass-production since it has an excellent fluidity at high temperature. Also, the polymeric lubricant having multi layer structure according to the present invention has an excellent ability to prevent its adhesion to a metal surface upon its processing so as to give a long-term workability to an extrusion, a calendering, a blow molding, an injection molding, etc. if an small amount of the powder of the present invention is mixed with a polyvinyl chloride resin.

Polyvinyl chloride resin has been widely used in various fields since it provides molded articles having excellent physical and chemical properties. However, polyvinyl chloride resin has various processing problems, including a narrow moldable temperature range, a high melting temperature and a low melt flow since its processing temperature is close to the thermal decomposition temperature. In addition, deposits are often formed, and therefore qualities of the final products are deteriorated since it tends to adhere to a metal surface of a processing machine when it is processed at high temperature.

Various techniques have been known to solve the above mentioned problems, especially the adhesive property to a metal surface of a processing machine. A representative technique is, for example to use a copolymerized polymeric lubricant including an alkyl(meth)acrylate monomer and an aromatic vinyl monomer as a major component in a vinyl chloride resin. U.S. Pat. No. 4,086,296 proposes a polymer made of a compositions of a low molecular weight polymer latex and a high molecular weight polymer, wherein the low molecular-weight polymer latex is obtained by polymerizing alkylacrylate, other acrylic monomer, and their copolymerizable vinyl-based monomer mixture at one step or multiple steps, and then the high molecular-weight polymer is obtained by further polymerizing methyl methacrylate, acrylate, other acrylic monomer, styrene, and their copolymerizable vinyl-based monomer mixture at one step or multiple steps. The acrylic composition polymer prepared thus has a rather excellent, but unsatisfactory, ability to prevent its adhesion to a metal surface, and also has a disadvantage in its mass-production because its powder fluidity is deteriorated at the high temperature in dry process.

U.S. Pat. No. 5,371,149 discloses a lubricant for a thermoplastic resin, which is a three-stage polymer, wherein methylmethacrylate is introduced as a major monomer in step 1 and step 3, and a copolymer consisting of alkylacrylate and an aromatic vinyl monomer is introduced as a major monomer in middle step (step 2), but the polymer does not meet a powder flowability at the high temperature in dry process, together with prevention of its adhesive property to a metal surface.

U.S. Pat. No. 5,942,581 proposes a method for using an alkylmethacrylate polymer having an alkyl group having 6 to 24 of carbon atoms, but the method has a disadvantage that it is also difficult to prevent its adhesive property and provide powder fluidity at high temperature.

E.U. Patent Application No. 1 209 203 A1 discloses a processing aid for thermoplastic resin, wherein its long-term duration of activity such as an adhesive property to a metal surface may be improved by using an organic peroxide including t-butylperoxy group as a polymerization initiator to copolymerize (meth)acrylate including an oxygen atom in addition to an ester bond with alkylacrylate, and their other copolymerizable vinyl monomer mixture. However, the processing aid prepared thus has an insufficient powder flowability at the high temperature.

Technical Problem

In order to solve the problems, it is an object of the present invention to provide a polymeric lubricant having multi layer structure having an excellent powder flowability, and also giving an excellent long-term workability to an extrusion, a calendering, a blow molding, an injection molding, etc. by minimizing the adhesive property to a metal surface of a processing machine in processing a vinyl chloride resin; and manufacturing method thereof.

Technical Solution

The foregoing and/or other aspects of the present invention are achieved by providing a polymeric lubricant having multi layer structure comprising silicone-based seeds.

Preferably, the polymeric lubricant includes:

a) silicone-based seeds comprising 3 to 10 parts by weight of a seed polymer latex obtained by polymerizing, with latex, a mixture comprising 6 to 25% by weight of silane having a vinyl group, and the remaining cyclosiloxane;

b) cores comprising 40 to 77 parts by weight of a core polymer for coating the seeds, the core polymer comprising 30 to 60% by weight of an aromatic vinyl monomer, 5 to 15% by weight of a vinyl-based comonomer and the remaining alkylacrylate, and obtained by polymerizing with an emulsion in the presence of the seeds; and c) 13 to 57 parts by weight of a shell polymer for coating the core polymer, the shell polymer comprising 1 to 37% by weight of an aromatic vinyl monomer, 1 to 3% by weight of the silicone-based polymer, 60 to 98% by weight of methyl methacrylate and the remaining vinyl-based comonomer, and obtained by polymerizing with an emulsion in the presence of the core polymer.

BEST MODE

Hereinafter, the present invention will be described in detail with reference to the preferred embodiments.

The polymeric lubricant according to the present invention includes silicone-based seeds, and preferably includes: silicone-based seeds comprising 3 to 10 parts by weight of a seed polymer latex obtained by polymerizing, with latex, a mixture comprising 6 to 25% by weight of silane having a vinyl group, and the remaining cyclosiloxane; cores comprising 40 to 77 parts by weight of a core polymer for coating the seeds, the core polymer comprising 30 to 60% by weight of an aromatic vinyl monomer, 5 to 15% by weight of a vinyl-based comonomer and the remaining alkylacrylate, and obtained by polymerizing with an emulsion in the presence of the seeds; and 13 to 57 parts by weight of a shell polymer for coating the core polymer, the shell polymer comprising 1 to 37% by weight of an aromatic vinyl monomer, 1 to 3% by weight of the silicone-based polymer, 60 to 98% by weight of methyl methacrylate and the remaining vinyl-based comonomer, and obtained by polymerizing with an emulsion in the presence of the core polymer.

The silicone-based polymer of the present invention may be manufactured from materials selected from the group consisting of cyclosiloxane and silane including a vinyl group.

The cyclosiloxane may be selected from the group consisting of hexamethylcyclotrisiloxane, octomethylcyclotetrasiloxane, dodecamethylcyclohexasiloxane or a mixture thereof.

Octomethylcyclotetrasiloxane may be more preferably used as the cyclosiloxane. The silane including the vinyl group may be selected from the group consisting of triethoxyvinylsilane, 3-(trimethoxysillyl) propyl acrylate, 3-(trimethoxysillyl) propylmethacrylate or a mixture thereof.

In the silicone-based polymer, the silane including the vinyl group may be used at the range of 6 to 25% by weight. The silicone-based polymer may have a problem of having an insufficient effect to prevent an adhesive property to a metal surface if the silane including the vinyl group is used at an amount of 6% by weight or less, while the silicone-based polymer may have a problem that it does not have a sufficient processability due to reduced melting of the vinyl chloride resin if its amount exceeds 25% by weight.

The core polymer of the present invention may be manufactured from materials selected from the group consisting of an aromatic vinyl monomer, a vinyl-based comonomer and alkylacrylates, and it may be manufactured by being polymerized in the presence of the silicone-based polymer.

The aromatic vinyl monomer may be styrene, α-methylstyrene or a mixture thereof.

The vinyl-based comonomer may be conventional vinyl-based monomers capable of copolymerizing with the aromatic vinyl monomer and/or said alkylacrylate, and an example of the vinyl-based comonomer includes methyl methacrylate, ethyl methacrylate, n-butyl methacrylate, lauryl methacrylate, stearyl methacrylate, tridecyl methacrylate, i-butyl methacrylate, t-butyl methacrylate, 2-ethylhexyl methacrylate, acrylonitrile, etc., but the present invention is not limited thereto, and conventional commercially available vinyl-based monomers having at least one double bond in its molecule may be selected and used.

The alkylacrylate may be selected from the group consisting of alkylacrylates with an alkyl group having 2 to 8 of carbon atoms such as ethylacrylate, propylacrylate, isopropylacrylate, butylacrylate, 2-ethylhexylacrylate, octylacrylate or a mixture thereof. The alkylacrylate may be preferably selected from the group consisting of butylacrylate, 2-ethylhexylacrylate and ethyl acrylate, which have relatively low glass transition temperature.

In the core polymer, the aromatic vinyl monomer may be used at an amount of 30 to 60% by weight. The core polymer may have a problem of having a deteriorated releasing property with a metal surface if the aromatic vinyl monomer is used at an amount of 30% by weight or less, while it may have a problem of having a reduced compatibility with polyvinyl chloride if its content exceeds 60% by weight. The vinyl-based comonomer may be used at an amount of 5 to 15% by weight. The core polymer may have a problem of having a reduced compatibility with polyvinyl chloride if the vinyl-based comonomer is used at an amount of 5% by weight or less, while it may have a problem of having a deteriorated lubricant property upon its processing if its content exceeds 15% by weight. Said alkylacrylate may be used as the remainder of the used amount of the aromatic vinyl monomer and the vinyl-based comonomer.

The shell polymer of the present invention may be manufactured from materials selected from the group consisting of an aromatic vinyl monomer, a silicone-based polymer, methyl methacrylate, and the remaining vinyl-based comonomers, and it may be manufactured by being polymerized in the presence of the core polymer latex.

The aromatic vinyl monomer may be identical or similar to materials used for manufacturing the core polymer latex.

The silicone-based polymer may be identical or similar to materials used for manufacturing the seed.

The vinyl-based comonomer may be also identical or similar to materials used for manufacturing the core polymer.

In the shell polymer, the aromatic vinyl monomer may be used at an amount of 1 to 37% by weight. The shell polymer may have a problem of having a reduced ability to prevent its adhesion to a metal surface if the aromatic vinyl monomer is used at an amount of 1% by weight or less, while it may have a problem of having a deteriorated surface property due to its compatibility with polyvinyl chloride if its content exceeds 37% by weight. The silicone-based polymer may be used at an amount of 1 to 3% by weight. The shell polymer may have a problem of having no improved powder property at the high temperature if the silicone-based polymer is used at an amount of 1% by weight or less, while it may have a problem of having a rather reduced melt flow upon its processing if its content exceeds 3% by weight. The vinyl-based comonomer may be used as the remainder of the used amount of the aromatic vinyl monomer and the vinyl-based comonomer.

The seed polymer latex may be used at an amount of 3 to 10 parts by weight, and preferably 5 to 8 parts by weight, based on the total amount of the polymeric lubricant. If the seed polymer latex is used at an amount of 3 parts by weight or less, then the problem is that an ability to prevent its adhesion to a metal surface may be rather reduced, while a melt flow may be reduced upon its addition to the polyvinyl chloride resin if the seed polymer latex is used at an amount of 10 parts by weight or more.

The core polymer may be used at an amount of 40 to 77 parts by weight, based on the total amount of the polymeric lubricant. If the core polymer is used at an amount of 40 parts by weight or less, then the problem is that an ability to prevent its adhesion to a metal surface may be rather reduced, while a powder property may be deteriorated at the high temperature in drying process if the core polymer is used at an amount of 77 parts by weight or more.

The shell polymer may be used at an amount of 13 to 57 parts by weight, based on the total amount of the polymeric lubricant. If the shell polymer is used at an amount of 13 parts by weight or less, then the problem is that a powder flowability may be reduced at the high temperature, while a polymeric lubricant property may be deteriorated if the shell polymer is used at an amount of 57 parts by weight or more.

A weight-average molecular weight of the core polymer may be adjusted in the range of 5,000 to 300,000, more preferably 10,000 to 200,000. If the core polymer has a weight-average molecular weight of 5,000 or less, then the problem is that a powder flowability may be reduced, while an ability to prevent its adhesion to a metal surface may be rather deteriorated if the core polymer has a weight-average molecular weight of 300,000 or more.

A weight-average molecular weight of the shell polymer may be adjusted in the range of 10,000 to 1,000,000. If the shell polymer has a weight-average molecular weight of 10,000 or less, then the problem is that a powder flowability may be reduced, while an ability to prevent its adhesion to a metal surface may be rather deteriorated, and a surface property such as a flow mark may be deteriorated if the shell polymer has a weight-average molecular weight of 1,000,000 or more. Especially, the shell polymer preferably may have a weight-average molecular weight of at least 10,000, and also have a higher weight-average molecular weight than that of the core polymer and a weight-average molecular weight of 1,000,000 or less. If a weight-average molecular weight generated by the mixture itself for a shell reaction is lower than that of the core copolymer, then the problem is that dry efficiency may be lowered, and difficulty for mass-production may appear since cake of the powder may be formed in the condensation, dehydration, and then dry process.

The polymeric lubricant having multi layer structure according to the present invention has an excellent powder flowability at high temperature, and an excellent effect to prevent an adhesive property to a metal surface of a processing machine in processing a vinyl chloride resin since a silicone-based polymer is used as a seed, contents of cores and shells is adjusted suitably, and an small amount of a silicone-based polymer is used in the shell.

A polymeric lubricant is manufactured by using a silicone-based polymer and a monomer having a low compatibility with a metal surface and by conferring powder flowability. The flowability of the polymeric lubricant is secured by adjusting a glass transition temperature of cores and shells, and a molecular weight. Such a polymeric lubricant is difficult to separate in the form of powder since it has a low glass transition temperature.

In order to solve the problem, a silicone-based polymer having a excellent powder property may be developed by using a small amount of a monomer having a high glass transition temperature, and a small amount of a silicone-based polymer when the shell is polymerized in the core-shell structure. That is, a polymeric powder having an excellent powder flowability and an excellent effect to prevent an adhesive property to a metal surface may be obtained in a coagulation process, and then a dry process by polymerizing a shell, composed of a monomer having a high glass transition temperature and an amount of a silicone-based polymer, with a polymeric lubricant (core) prepared by adjusting its glass transition temperature at a low level using a silicone-based polymer and a monomer having a low compatibility with a metal surface.

The polymeric lubricant (core) of the present invention reduces an adhesive property to a metal surface of a processing machine by reducing an affinity of a melted resin to the metal surface. And, it increases slippage between particles by reacting between particles of polyvinyl chloride resins. This functions to reduce a friction force and delay gelation. This function also reduces a thermal increase induced by the processing and delays gelation of vinyl chloride resin. This function appears in the beginning of the process before the gelation is completely carried out and a polyvinyl chloride resin is melted due to heat and friction in the processing. That is, the polymeric lubricant functions as an external lubricant for its processing. Accordingly, the polymeric lubricant according to the present invention is obtained in the same reactor from a multi-layered latex having a core-shell structure by sequentially conducting a step of manufacturing a polymeric lubricant (core) so as to improve an effect to prevent an adhesive property to a metal surface, and a step of manufacturing a polymer (shell) so as to facilitate preparation of a polymeric lubricant upon its commercial production.

The polymeric lubricant of the present invention is provided in the form of powder through a coagulation, dehydration and dry processes after it is manufactured in the form of latex by polymerization with an emulsion.

The polymeric lubricant having multi layer structure of the present invention may be useful to its mass-production because of its excellent flowability at the high temperature. Also, the polymeric lubricant having multi layer structure of the present invention has a superior effect to prevent an adhesive property to a metal surface of a processing machine without deteriorating inherent physical and chemical properties which a vinyl chloride resin composition shows since it is added at an amount of 0.1 to 5 parts by weight, based on 100 parts by weight of the vinyl chloride resin.

Also, a method for manufacturing the polymeric lubricant having multi layer structure of the present invention as described above is described in detail, as follows.

The method for manufacturing the polymeric lubricant having multi layer structure of the present invention includes:

a) a preparing step of a seed latex by polymerizing a seed forming mixture including 6 to 25% by weight of silane having a vinyl group, and the remaining cyclosiloxane;

b) a preparing step of a core polymer for covering the seed polymer by polymerizing a core-forming mixture including 30 to 60% by weight of an aromatic vinyl monomer, 5 to 15% by weight of a vinyl-based comonomer and the remaining alkylacrylate in the presence of the seed latex including 3 to 10 parts by weight of the silicone-based polymer obtained in the previous step; and c) a preparing step of a shell polymer latex for covering the core polymer by polymerizing a shell-forming mixture including 1 to 37% by weight of an aromatic vinyl monomer, 1 to 3% by weight of the silicone-based copolymer, 60 to 98% by weight of methyl methacrylate and the remaining vinyl-based comonomer in the presence of the core polymer including 3 to 10 parts by weight of the seed polymer and 40 to 77 parts by weight of the core polymer, obtained in the previous step.

It should be understood that each of the components constituting the polymeric lubricant is identical to those used for description of the components constituting the aforementioned polymeric lubricant.

In the manufacturing step of a seed latex in the step a), an emulsifying agent may be added in addition to the aforementioned components to emulsify the components, an emulsion monomer may be ground to a size of a fine particle using a homogenizer with a rotatory power of 10,000 rpm, the resultant mixture may be added to an hot aqueous acid solution to be polymerized, cooled, and then neutralized with an aqueous alkaline solution to manufacture a silicone-based polymer latex.

Also, a catalyst and an emulsifying agent may be added in the manufacturing step of a silicone-based polymer seed in the step a).

The catalyst is preferably dodecylbenzenesulfonic acid, that is aliphatic substituted benzene sulfonic acid, and sodium dodecylbenzenesulfonic acid substituting dodecylbenzenesulfonic acid with sodium, etc. may be used as the emulsifying agent. After polymerization is completed, sodium carbonate may be used for neutralizing an acidic latex to pH 7 to 8.

In the manufacturing step of the core polymer latex in the step b), in addition to the aforementioned components, a chain transfer agent, a polymerization initiator, an emulsifying agent, and an ion exchanged water may be added sequentially, or added sequentially or at the same time in the form of pre-emulsion to manufacture a copolymer latex.

In the manufacturing step of the shell polymer latex in the step c), in addition to the aforementioned components, a chain transfer agent, a polymerization initiator, an emulsifying agent, and an ion exchanged water each may be added at the same time, or added at the same time or sequentially in the form of pre-emulsion to manufacture a copolymer latex.

Known emulsifying agents is used as the emulsifying agent that may be used for the reaction as describe above, but not limited thereto. For example, the emulsifying agent includes anionic emulsifying agents such as fatty acid salts, alkylsulfonic ester salts, alkylbenzenesulfonic acid salts, sulfosuccinic acid biester salts, or non-ionic emulsifying agent such as polyoxyethylene alkylether, polyoxyethylene fatty acid ester, etc., and they may be used alone or in combination thereof.

Water-soluble or fat-soluble initiators, redox initiators, etc. may be used as the initiator that may be used for the reaction. An example of organic peroxides includes t-butylhydroperoxide, cumenehydroperoxide, benzoylperoxide, laurylperoxide, etc. And, water-soluble initiator includes potassium persulfate, ammonium persulfate, sodium persulfate, etc.

The chain transfer agent that is used for the reaction is not limited thereto. For example, t-dodecylmercaptan, n-dodecylmercaptan, etc. may be used.

As described above, the polymeric latex having a multi layer structure manufactured according to the present invention has a powder property so as to be conveniently mass-produced since it has an excellent powder flowability when a slurry is dehydrated and dried, the slurry obtained by coagulating the polymeric latex with a calcium chloride. And, the polymeric lubricant having multi layer structure in the form of powder of the present invention has an excellent effect to prevent an adhesive property to a metal surface of a processing machine in the calendering, the extrusion, the blow molding, the injection molding processes, etc., and therefore its process productivity may be improved since it is added to the polyvinyl chloride resin.

Hereinafter, the detailed description and specific examples, while indicating preferred embodiments of the invention, are given by way of illustration only for their better understanding, without limiting the spirit and scope of the invention to the following preferred embodiments.

(Preparation of Powder)

4 parts by weight of a calcium chloride solution (10% by weight) is added for a solid component in a polymer latex, condensed to obtain a slurry, and remainders such as metal ions etc., is removed off by washing the slurry with ion exchanged water 2 to 3 times, and dehydration is conducted, and then the dehydrated slurry is dried with a miniature fluidized-bed dryer, used for a laboratory application, at 50° C. for 4 hours to obtain a powder sample.

(Weight-Average Molecular Weight)

The sample obtained by the method of yielding the powder is dissolved in THF, and then the dissolved fraction was measured using GPC. A polystyrene standard sample is used in a calibration curve.

(Powder Flowability)

The sample obtained by the method of preparing the powder is run in a miniature fluidized-bed dryer, used for a laboratory application, at 75° C. for 30 minutes, and then an cake level of the powder was measured. The evaluation was carried out using a 5-scale method method, and its standards are as follows.

5: No sample powder is caked at all.
4: Sample powder is nearly caked.
3: ¼ of sample powder is caked.
2: ½ of sample powder is caked.
1: At least ¾ of sample powder is caked.

(Adhesive Property)

In order to measure an adhesive property, 100 parts by weight of polyvinyl chloride (degree of polymerization=800, LS-080, manufactured by LG Chemical, CO., Ltd.), 3.0 parts by weight of a tin-based stabilizer, and 0.9 parts by weight of calcium stearate (Ca-St) were added to a kneader (Henshel Mixer) at an ambient temperature, mixed at 1,000 rpm while elevating to a temperature of 115° C., and then cooled to 40° C. to complete a master batch.

3.0 parts by weight of test samples each were added to the master batch, mixed at an ambient temperature again, 100 parts by weight of a powder mixture was milled for 4 minutes under the conditions of a mixing temperature of 200° C., the number of rotations of a roll of 14×15 rpm, and a roll gap of 0.3 mm using a 6-inch 2-roll mill, and then the adhesive property was measured in the roll surface. The evaluation was carried out using a 5-scale method, and its standards are as follows.

5: No sample powder is extended at all with its peeling.
4: Sample powder is nearly extended with its peeling.
3: Sample powder is a little extended with its peeling.
2: Sample powder is significantly extended with its peeling.
1: No sample powder is peeled at all.

(Gelation Time)

60 parts by weight of the polyvinyl chloride resin composition, identical to those used for evaluation of the adhesive property, was mixed under a condition of 180° C. and 30 rpm using a Haake Rheometer, and then a time period was measured from a minimum load to a maximum load.

(Optical Property)

The polyvinyl chloride resin composition, identical to those used for measurement of the adhesive property, was milled at 200° C. for 4 minutes using a 2-roll mill to obtain a 0.4 mm sheet. The sheet was cut to 150 mm×200 mm, and laminated into 3 mm×170 mm×220 mm of a mold with a same milling direction. The laminated sheet was pressed 8 minutes using a 195° C. heating press to prepare a 3 mm-thick sample, which was measured for transparency and haze.

MODE FOR INVENTION

The common silicone-based polymer seed latex was used in the following Examples and Comparative Examples. A method of preparing a seed is as follows.

(Preparing of Silicone-Based Polymer Seed Latex)

235 g of an ion exchanged water, 1 g of dodecylbenzene sulfonic acid (70% by weight solution), 5 g of dodecylbenzene sulfonic acid sodium (9.5% by weight solution), 71.5 g of octamethylcyclotetrasiloxan, 3.5 g of triethoxymethylsilane and 6.5 g of trimethoxysillyl propyl methacrylate were added to a vessel to be emulsified, and ground for 30 seconds to a size of a fine particle using a homogenizer with a high-speed rotatory power of 10,000 rpm. The emulsified monomer was added to a reactor with a nitrogen atmosphere, and reacted for 5 hours while being heated to a temperature of 85° C. The reaction was completed, the monomer was cooled to an ambient temperature, and kept for 24 hours, and then a seed latex was prepared by neutralizing pH to 7.5 with sodium carbonate (2% by weight solution). The polymerized latex has a particle size of 1,500 Å and a turnover rate of 85%.

Example 1

1) Reaction Step 1

Core Polymerization 139.66 parts by weight of a silicone-based polymer seed latex was added to a 3 L 4-necked reactor equipped with a thermometer, a nitrogen injector, a cooler and an agitator, and then 261.3 g of an ion exchanged water was added thereto. To another vessel were added 200 g of an ion exchanged water, 15.6 g of a 3% by weight sodium laurylsulfonic acid (sodium lauryl sulfate, SLS) solution, 150.0 g of styrene, 126.0 g of butylacrylate, 30.0 g of methylmethacrylate, 0.1 g of t-dodecyl mercaptan, and agitated to prepare a stable pre-emulsion. The emulsified monomer (pre-emulsion) was continuously added to a reactor at a temperature of 75° C. and a nitrogen atmosphere for 3 hours. At this time, 0.42 g of a 3% potassium persulfate solution and 10 g of an activator solution were continuously added thereto at the same time while maintaining a temperature in the inside of the reactor at 75° C. After reaction for 3 hours, the resultant mixture was stirred at 75° C. for 1 hour to obtain a polymer latex, which had a weight-average molecular weight of 50,000.

2) Reaction Step 2

Shell Polymerization 461.3 g of an ion exchanged water, 15.6 g of a 3% by weight sodium laurylsulfonic acid (sodium lauryl sulfate, SLS) solution, 183.36 g of methylmethacrylate, 75.36 g of styrene, 0.1 g of t-dodecylmercaptan were mixed to prepare a pre-emulsion. After the stabilized pre-emulsion was prepared, the pre-emulsion mixture and 24.58 g of a silicone-based polymer latex were simultaneously added to the polymerized latex prepared in the Reaction Step 1, and 3.25 g of a 3% potassium persulfate solution and 10 g of an activator solution were simultaneously added thereto, and then reacted at 75° C. The resultant mixture was stirred for 1 hour to obtain a final polymer latex, which has a molecular weight of 150, 000.

The activator solution used herein is a solution consisting of 0.015 parts by weight of sodium ethylene diamine tetranitric acid, 0.02 parts by weight of sodium formaldehyde hydrosulfite, 0.001 parts by weight of ferrous sulphate heptahydrate, 1.165 parts by weight of an ion exchanged water.

Major components are listed in the following Table 1 in the step of preparing the copolymer of Example 1 as described above, and in each reaction step to manufacture copolymers of Examples 2 to 6 and Comparative Examples 1 to 4, as described later.

Example 2

223.46 parts by weight of a silicone polymer seed latex was used at the first step, and then a polymerization method was identical to that of Example 1.

Example 3

83.80 parts by weight of a silicone polymer seed latex was used at the first step, and then a polymerization method was identical to that of Example 1.

Example 4

279.32 parts by weight of a silicone polymer seed latex was used at the first step, and then a polymerization method was identical to that of Example 1.

Example 5

139.66 parts by weight of a silicone polymer seed latex was used, and 36.87 parts by weight of the silicone polymer seed latex used in the shell was used at the first step, and then a polymerization method was identical to that of Example 1.

Example 6

139.66 parts by weight of a silicone polymer seed latex was used, and 12.29 parts by weight of the silicone polymer seed latex used in the shell was used at the first step, and then a polymerization method was identical to that of Example 1.

Comparative Example 1

27.93 parts by weight of a silicone polymer seed latex was used at the first step, and then a polymerization method was identical to that of Example 1.

Comparative Example 2

418.98 parts by weight of a silicone polymer seed latex was used at the first step, and then a polymerization method was identical to that of Example 1.

Comparative Example 3

139.66 parts by weight of a silicone polymer seed latex was used, and the silicone polymer seed latex used in the shell was not used at the first step, and then a polymerization method was identical to that of Example 1.

Comparative Example 4

139.66 parts by weight of a silicone polymer seed latex was used, and 73.74 parts by weight of the silicone polymer seed latex used in the shell was used at the first step, and then a polymerization method was identical to that of Example 1.

TABLE 1

| Items | Composition | | | Molecular Weight (Mw, 10,000) |
|---|---|---|---|---|
| | Seed Silicone-based Polymer | Core MMA/ST/BA | Shell MMA/ST/Silicone-based Polymer | |
| Example 1 | 5 | 5/25/21 | 30.56/12.56/0.88 | 15 |
| Example 2 | 8 | 5/23/20 | 30.56/12.56/0.88 | 14 |
| Example 3 | 3 | 5/26/22 | 30.56/12.56/0.88 | 15 |
| Example 4 | 10 | 5/22/19 | 30.56/12.56/0.88 | 13 |
| Example 5 | 5 | 5/25/21 | 30.34/12.34/1.32 | 15 |
| Example 6 | 5 | 5/25/21 | 30.78/12.78/0.44 | 15 |
| Comparative Example 1 | 1 | 5/27/23 | 30.56/12.56/0.88 | 16 |
| Comparative Example 2 | 15 | 5/20/16 | 30.56/12.56/0.88 | 10 |
| Comparative Example 3 | 5 | 5/25/21 | 31/12/0 | 16 |
| Comparative Example 4 | 5 | 5/25/21 | 29.68/11.68/2.64 | 10 |

In the Table 1, abbreviated names are as follows.
ST: stylene,
BA: n-butylacrylate,
MMA: methylmethacrylate The samples of Examples and Comparative Examples as listed in Table 1 were measured for the evaluation tests, and the results were listed in Table 2.

TABLE 2

| Items | Adhesive Property | Powder Flowability | Gelation Time (sec) | Optical Property | |
|---|---|---|---|---|---|
| | | | | Transparency | Haze |
| Example 1 | 5 | 4 | 130 | 73 | 26 |
| Example 2 | 5 | 4 | 125 | 73 | 24 |
| Example 3 | 5 | 5 | 123 | 75 | 25 |
| Example 4 | 5 | 4 | 122 | 73 | 27 |
| Example 5 | 5 | 4 | 135 | 72 | 30 |
| Comparative Example | 3 | 4 | 130 | 72 | 27 |
| Comparative Example | 5 | 4 | 118 | 66 | 38 |
| Comparative Example | 5 | 2 | 120 | 73 | 25 |
| Comparative Example | 5 | 5 | 140 | 69 | 35 |

Referring to the properties of Examples, it was revealed that the peeling properties from the metal surface and the anti-caking properties are excellent. In the case of Comparative Example 1, the adhesive properties are poor due to its insufficient content of the silicone-based polymer used in the seed, and in the case of Comparative Example 2 and Comparative Example 4, the optical properties were deteriorated since the content of the silicone-based polymer seed latex used in the seed and the silicone-based polymer used in the shell each were beyond the range of the present invention. In the case of Comparative Example 3, the caking of the powder was increased if the silicone-based polymer was not added to the shell. As described in Examples 1 to 6, it was revealed that the adhesive properties and the cake property improved without deteriorating the optical properties if the amount of the silicone-based polymer as the seed, and the amount of the silicone-based polymer introduced into the sell were within the range of the present invention.

ADVANTAGEOUS EFFECTS

The polymeric lubricant having multi layer structure according to the present invention may improve a long-term workability to an extrusion, a calendering, a blow molding, an injection molding, etc. since it has an excellent peeling property to a metal surface. Also, it is possible to conduct a high-speed process due to its superior peeling property. Also, the present invention may provide a polymeric powder having good powder properties, which may be dried at the high temperature and be conveniently mass-produced since a silicone-based polymer latex is introduced into a shell in manufacturing the polymeric lubricant of the method of the present invention.

Although a few embodiments of the present invention have been shown and described, it would be appreciated by those skilled in the art that various modification and changes might be made in this embodiment without departing from the principles and spirit of the invention, the scope of which is defined in the claims and their equivalents.

What is claimed is:

1. A polymeric lubricant having multi layer structure comprising:
    a) silicone-based seeds comprising 3 to 10 parts by weight of a seed polymer latex obtained by polymerizing, with latex, a mixture comprising 6 to 25% by weight of silane having a vinyl group, and a cyclosiloxane, wherein the silane having the vinyl group is selected from the group consisting of triethoxyvinylsilane, 3-(trimethoxysilyl) propyl acrylate, 3-(trimethoxysilyl)propylmethacrylate and a mixture thereof;
    b) cores comprising 40 to 77 parts by weight of a core polymer for covering the seeds, the core polymer comprising 30 to 60% by weight of an aromatic vinyl monomer, 5 to 15% by weight of a vinyl-based comonomer and a alkylacrylate, and obtained by polymerizing with an emulsion in the presence of the seeds; and c) 13 to 57 parts by weight of a shell polymer for covering the core polymer, the shell polymer comprising 1 to 37% by weight of an aromatic vinyl monomer, 1 to 3% by weight of a silicone-based polymer, 60 to 98% by weight of methyl methacrylate and a vinyl-based comonomer, and obtained by polymerizing with an emulsion in the presence of the core polymer.

2. The polymeric lubricant according to the claim 1, wherein said cyclosiloxane is selected from the group consisting of hexamethylcyclotrisiloxane, octomethylcyclotetrasiloxane and dodecamethylcyclohexasiloxane.

3. The polymeric lubricant according to the claim 1, wherein the aromatic vinyl monomer is selected from the group consisting of styrene, α-methylstyrene, and a mixture thereof.

4. The polymeric lubricant according to the claim 1, wherein said alkylacrylate is selected from the group consisting of lower alkylacrylate with an alkyl group having 2 to 8 of carbon atoms, selected from the group consisting of ethylacrylate, propylacrylate, isopropylacrylate, butylacrylate, 2-ethylhexylacrylate and octylacrylate.

5. The polymeric lubricant according to the claim 1, wherein the core polymer has a weight-average molecular weight of 5,000 to 300,000.

6. The polymeric lubricant according to the claim 1, wherein the shell polymer has a weight-average molecular weight of 10,000 to 1,000,000.

7. The polymeric lubricant according to the claim 6, wherein the shell polymer has a weight-average molecular weight of at least 10,000, and has a higher weight-average molecular weight than that of the core polymer latex and a weight-average molecular weight of 1,000,000 or less.

* * * * *